J. M. Brunswick,

Billiard Cushion,

No. 754, Reissued July 12, 1859.

Witnesses.
H. E. Clifton
Charles S. Fisher

Inventor:
John M. Brunswick.

AM. PHOTO-LITHO. CO. N.Y. (OSBORNE'S PROCESS)

UNITED STATES PATENT OFFICE.

JOHN M. BRUNSWICK, OF CINCINNATI, OHIO.

IMPROVED BILLIARD-TABLE CUSHION.

Specification forming part of Letters Patent No. 18,799, dated December 8, 1857; Reissue No. 754, dated July 12, 1859.

*To all whom it may concern:*

Be it known that I, JOHN M. BRUNSWICK, of Cincinnati, in the county of Hamilton and State of Ohio, have invented a new and useful Improvement in Billiard-Table Cushions; and I do hereby declare that the following is a full description thereof, reference being had to the accompanying drawings and the letters of reference marked thereon, making part of this specification.

The nature of the invention consists in the order of the arrangement of the materials used for making a billiard-table cushion.

Figure 2:
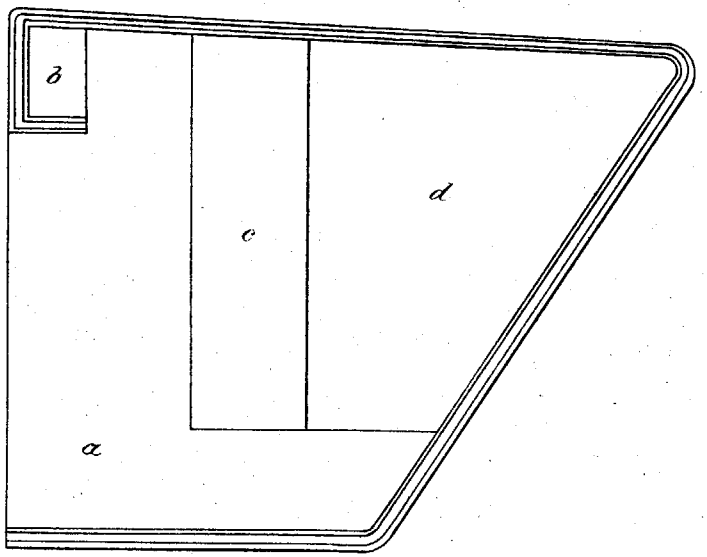
Figure 1:
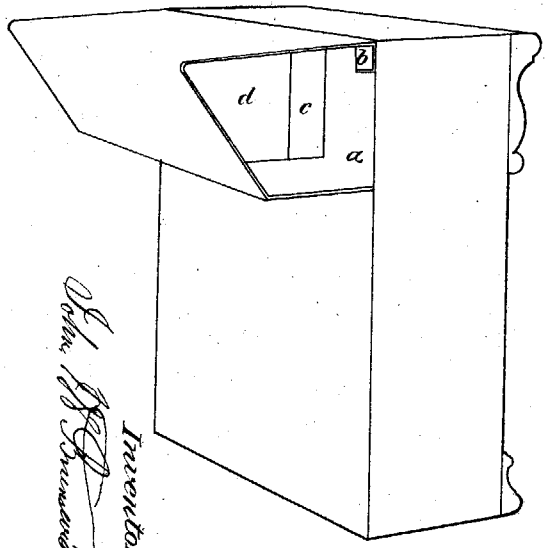

Figure 1 is a perspective view of rail for billiard-table provided with the improved cushion. Fig. 3 is a transverse sectional view of the improved cushion, showing the arrangement of its parts.

*a* is the wooden portion of the rail, made of the form represented, and provided with the key *b*, for the purposes of securing the cloth that surrounds the cushion. *c* is a piece of cork, prepared of suitable thickness, and pla e l next to the wood *a*, and made to form part of the cushion. *d* is a piece of india rubber, molded in suitable form and arranged in front of the cork *c*, as represented. *e* is a piece of pasteboard, made to cover the exposed parts of the cork *c* and rubber *d*. *f* is a piece of leather arranged in front of the pasteboard *e*. *g* is a piece of cloth which forms the outer covering of the cushion by the arrangement of the cork *c* in rear of the rubber *d*.

As above described, I am enabled fully to preserve the elastic properties of the rubber, by means of which the ball is always made to rebound with proper force, and also to prevent jarring or noise. When the ball strikes the cushion, the pasteboard *e* and leather *f*. afford to the cushion a solidity of surface, so that the ball may leave the cushion at the proper angle.

What I claim as my invention, and desire to secure by Letters Patent, is—

That order in the arrangement of the materials composing a billiard-table cushion which places the cork in the rear, the rubber in front of it, and the paper, leather, and cloth, or the equivalents thereof, outside, in the manner and for the purpose set forth, but I do not claim the materials irrespective of this arrangement.

JOHN M. BRUNSWICK.

Witnesses:

CHARLES L. FISHER,
H. E. CLIFTON.